Dec. 25, 1962   N. K. MATHISON   3,070,226
CONTAINER FOR FOODSTUFFS
Filed Jan. 18, 1961
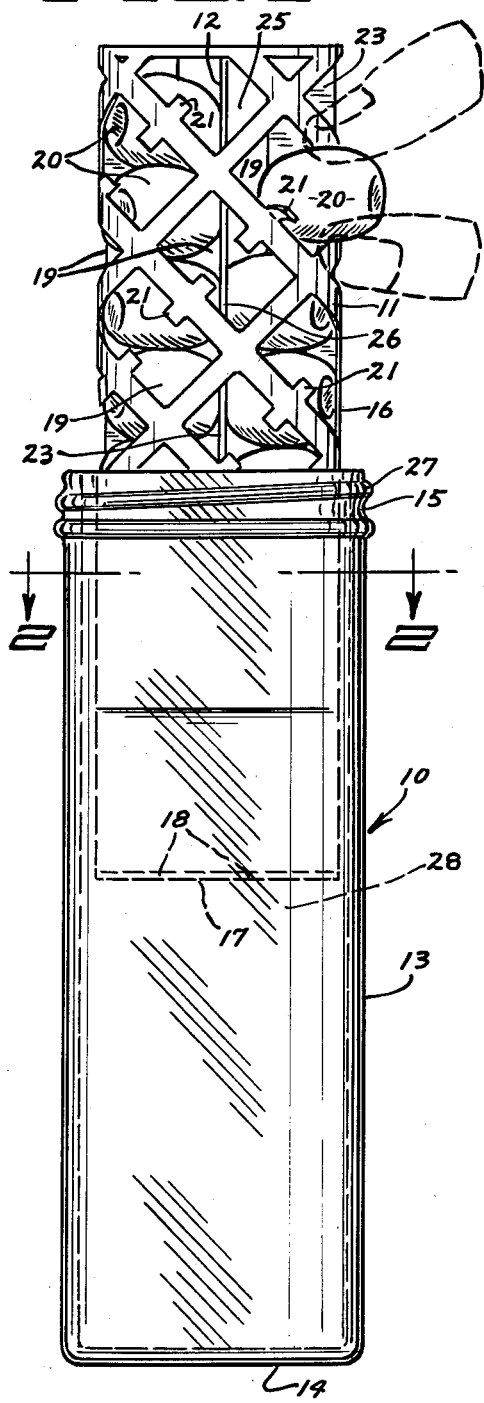
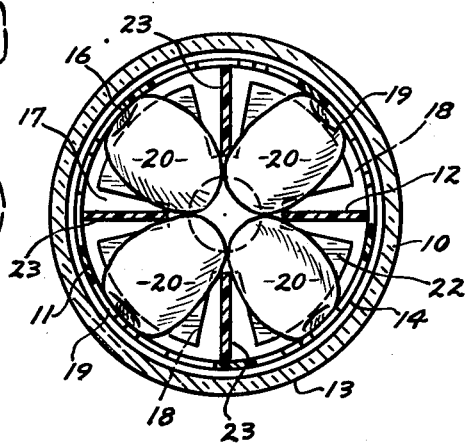
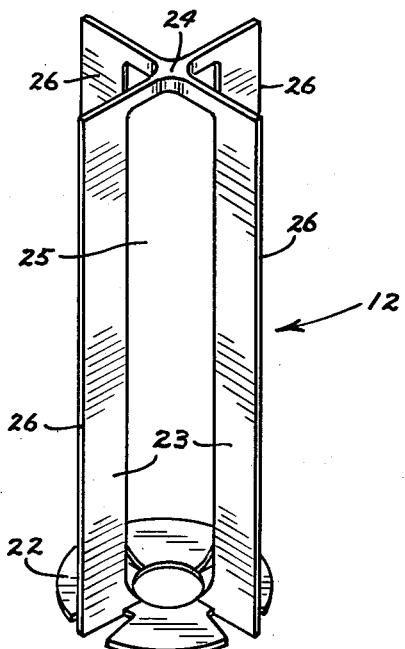
INVENTOR.
NORMA K. MATHISON
BY
Braddock and Braddock
ATTORNEYS

United States Patent Office 3,070,226
Patented Dec. 25, 1962

3,070,226
CONTAINER FOR FOODSTUFFS
Norma K. Mathison, 3129 Fremont Ave. S.,
Minneapolis 8, Minn.
Filed Jan. 18, 1961, Ser. No. 83,591
3 Claims. (Cl. 206—56)

This application is a continuation-in-part of my pending application, Serial No. 5,002, for Container for Foodstuffs and Method of Packing the Same, filed January 27 1960, now abandoned.

The invention herein has relation to a new and improved container for discrete pieces of food, such, for example, as olives, including a fluid-tight exterior receptacle housing an apertured interior receptacle itself housing an open supporting frame for the discrete pieces or olives. Although a container made according to the invention could be employed for the purpose of storing various types of discrete pieces of foodstuffs, in the illustrated embodiment it has been devised to be especially useful for the purpose of stowing olives, in liquid as is customary, to be dispensed.

In the accompanying drawing forming a part of this specification,

FIG. 1 is a side elevational view of a container incorporating features and characteristics of the invention disclosing an apertured interior receptacle of said container housing an open supporting frame thereof as when partially removed from a fluid-tight exterior receptacle of the container;

FIG. 2 is an enlarged sectional view, taken on line 2—2 in FIG. 1; and

FIG. 3 is a perspective view, on a reduced scale, of the open supporting frame of said container as it would appear when removed from the apertured interior receptacle thereof.

With respect to the drawing and the numerals of reference thereon, 10 denotes a fluid-tight exterior receptacle, 11 indicates an apertured interior receptacle and 12 represents an open supporting frame of the new and improved container.

As shown, the fluid-tight exterior receptacle 10 is constituted as a bottle open at its upper end consisting of a cylindrical side wall 13 and a flat bottom wall 14. An upper end portion 15 of the exterior receptacle or bottle is of reduced diameter and the bottom wall 14 is in perpendicular relation to the side wall 13. The fluid-tight exterior receptacle or bottle can be of glass, or of other material suitable to its purpose, and can be transparent, translucent or opaque, as may be preferred.

The interior receptacle 11 is constituted as an apertured pouch or bag which can be of plastic, or of any other material suitable to its purpose. Said interior receptacle, pouch or bag is open at its upper end and consists of a cylindrical side wall 16 and a flat bottom wall 17. The cylindrical side wall 16 is of diameter to be more or less loosely slidable in the upper end portion 15 of reduced diameter of the exterior receptacle or bottle 10, and the bottom wall 17 is perforated, as at 18.

Spaced apertures, each represented 19, in the cylindrical side wall 16 of the interior receptacle, pouch or bag 11 are for the purpose of permitting removal of discrete pieces of foodstuffs, olives as disclosed, from said interior receptacle, pouch or bag when this is intentional. As shown, olives, each designated 20, are stowed in the interior receptacle, pouch or bag 11 and the apertures 19 are of substantially equal area and of configuration and size to render the discrete pieces or olives readily and easily individually removable therethrough from the interior receptacle, pouch or bag. Desirably, each aperture 19 can be of configuration and size normally to preclude accidental passage of the discrete pieces or olives but to permit manual removal of the discrete pieces or olives from within said interior receptacle, pouch or bag. The construction and arrangement can be such that the material of the interior receptacle, pouch or bag can be misshaped, as by stretching or otherwise, to permit individual removal of the discrete pieces or olives, or elements, such as tabs 21, can be flexed in the accomplishment of manual removal of said discrete pieces or olives. In practice, the fingers of a person, or a suitable tool grasped by the fingers, can be employed to the accomplishment of manual removal of the discrete pieces or olives by way of the apertures when this is intentional. The interior receptacle, pouch or bag also can be transparent, translucent or opaque.

The open supporting frame 12 is constituted as a lower base member 22 and panels 23 in spaced, parallel relation to each other extending upwardly from said lower base member in perpendicular relation thereto. As disclosed, the panels 23 are at 90 degrees apart, and different sets of oppositely disposed panels are in a single plane. The upper ends of the panels of the different sets are interconnected, as at 24, and a central portion of the supporting frame, between the lower base member 22 and the interconnection 24, as well as between oppositely disposed panels of the different sets, is open, as at 25. Said open supporting frame can be of plastic material, or of any other desirably rigid material suitable to its purpose. Each set of panels 23 adjacent to each other also will be in outwardly diverging relation, as well as parallel in direction longitudinally of the open supporting frame. While the open supporting frame 12 as shown includes four panels spaced at 90 degrees apart, it will be apparent that the number of panels, such as 23, which an open supporting frame such as 12 is to include can be less or greater than four and spaced at a greater or less number of degrees apart than in the disclosure as made.

The open supporting frame 12 will be inserted into the apertured interior receptacle 11 so that the lower base member 22 rests upon the bottom wall 17 of said interior receptacle and the outer marginal edges 26 of the panels 23 desirably pressingly engage inner surfaces of the cylindrical side wall of the interior receptacle, as in FIG. 2 of the drawing. When said interior receptacle and open supporting frame shall have been so assembled, discrete pieces or olives will be loaded into the different vertical channels, provided by adjacent sets, respectively, of panels 23, one upon the other as in the drawing. The interior receptacle 11 will be inserted into the exterior receptacle 10, after discrete pieces or olives shall have been stowed in the vertical channels in said interior receptacle between and provided by adjacent panels, so that the bottom wall of the interior receptacle rests upon the bottom wall of said exterior receptacle, and thereafter a suitable cover cap (not shown) will be threaded onto an external thread 27 surrounding the reduced diameter upper end portion 15 of said exterior receptacle.

In addition to interconnecting the upper ends of the panels 23, the portion 24 of the open supporting frame 12 is for the purpose of readily and easily accomplishing elevation of said open supporting frame, together with the interior receptacle, pouch or bag 11 as a unit, in and/or its removal from the exterior receptacle or bottle 10. The interconnection or portion 24 of course will lie above the discrete pieces of foodstuffs, olives as shown, beneath a cover cap when assembled with the external thread 27 on the upper end portion of the exterior receptacle or bottle.

The container will have liquid, denoted 28, therein in which the discrete pieces or olives are stowed. Desirably, the discrete pieces or olives will be deposited into the apertured interior receptacle, pouch or bag, between panels 23, and said interior receptacle, pouch or bag with open supporting frame and stowed discrete pieces or olives, will be deposited into the exterior receptacle or bottle while substantially free of liquid. Thereafter, liquid, such as 28, will be poured into the container up to an appropriate level, and, finally, a suitable cover cap will be applied onto the external thread 27.

The construction and arrangement as disclosed is provision for the accomplishment of ready and easy manual removal of the discrete pieces or olives from the container without liability of spilling any of the liquid. When discrete pieces or olives are to be removed, the open supporting frame 12 and the interior receptacle, pouch or bag 11 as a unit will be elevated, as by grasping the portion 24 of said open supporting frame, to the extent desired, to cause discrete pieces or olives to be accessible at elevation above the exterior receptacle or bottle whence said discrete pieces or olives can be manually removed, as in the manner hereinbefore set forth. After removal of discrete pieces or olives in quantity as may be desired, the open supporting frame, with interior receptacle, pouch or bag as a unit, can be lowered in the fluid-tight exterior receptacle or bottle and the cover cap replaced. Obviously, no liquid need become spilled upon elevation of said open supporting frame and interior receptacle, pouch or bag in said exterior receptacle or bottle. Instead, the perforations 18 in the bottom wall 17 of the interior receptacle, pouch or bag will be capable of permitting said interior receptacle, pouch or bag and the open supporting frame therein to become drained clean of fluid with elevation of the interior receptacle, pouch or bag and said open supporting frame in and relative to the exterior receptacle or bottle without liability of spilling of any of the liquid from said exterior receptacle or bottle.

What is claimed is:

1. A container for discrete pieces of foodstuffs, such, for example, as olives, comprising a fluid-tight exterior receptacle consisting of an upstanding cylindrical side wall closed at its lower and open at its upper end, closure means for said upper end, an interior receptacle for stowage of the discrete pieces consisting of an upstanding substantially cylindrical side wall made of a stretchable material, said side wall being at least partially closed at its lower and open at its upper end, the side wall of said interior receptacle having apertures therethrough of configuration to prevent accidental passage of said discrete pieces through said apertures, the side wall material bounding said apertures being deformable to permit manual removal of said discrete pieces from the interior receptacle by way of said apertures and said interior receptacle being longitudinally movable inwardly and outwardly of said exterior receptacle thus to selectively situate said apertures both within and without the exterior receptacle, and an open supporting frame fitted within said interior receptacle, said open supporting frame including a lower base member and a plurality of upstanding spaced apart sets of co-planar panels fixedly attached to said base member, said sets being joined together at the upper end thereof and each panel in each set being spaced from its other panel to form an open central portion in said supporting frame.

2. The combination as specified in claim 1 wherein said walls of said inner receptacle are provided with deflectable tabs integral with said wall and projecting into said apertures, said tabs being movable to a position to permit manual removal of said discrete pieces through said apertures.

3. A container for discrete pieces of foodstuffs, such, for example, as olives, comprising a fluid-tight exterior receptacle consisting of an upstanding cylindrical side wall closed at its lower and open at its upper end, closure means for said upper end, and an interior receptacle for stowage of the discrete pieces consisting of an upstanding substantially cylindrical side wall made of a stretchable material, said side wall being at least partially closed at its lower and open at its upper end, the side wall of said interior receptacle having apertures therethrough, a plurality of deflectable tabs integral with said wall and at least one projecting into each aperture to prevent accidental passage of said discrete pieces through said apertures, said tabs being movable to a position to permit manual removal of said discrete pieces through said apertures, and said interior receptacle being longitudinally movable inwardly and outwardly of said exterior receptacle thus to selectively situate said apertures both within and without the exterior receptacle.

References Cited in the file of this patent
UNITED STATES PATENTS

| | | |
|---|---|---|
| 372,233 | Northrop | Oct. 25, 1887 |
| 1,623,703 | Ruff | Apr. 5, 1927 |
| 2,540,758 | Rinnman | Feb. 6, 1951 |
| 2,904,205 | Callery | Sept. 15, 1959 |
| 3,004,657 | Hyman | Oct. 17, 1961 |